Sept. 29, 1964  M. E. ANDERSON  3,151,257
PROGRAM TIMER
Filed May 1, 1961  3 Sheets-Sheet 1

INVENTOR.
MAYNARD E. ANDERSON
BY ANDREW K. FOULDS
His ATTORNEY

INVENTOR.
MAYNARD E. ANDERSON
BY ANDREW K. FOULDS
HIS ATTORNEY

Sept. 29, 1964    M. E. ANDERSON    3,151,257
PROGRAM TIMER

Filed May 1, 1961    3 Sheets-Sheet 3

INVENTOR.
MAYNARD E. ANDERSON
BY
ANDREW K. FOULDS
HIS ATTORNEY

United States Patent Office 3,151,257
Patented Sept. 29, 1964

3,151,257
PROGRAM TIMER
Maynard E. Anderson, Southfield, Mich., assignor to American Radiator & Standard Sanitary Corporation, New York, N.Y., a corporation of New York
Filed May 1, 1961, Ser. No. 106,697
13 Claims. (Cl. 307—141.4)

This invention relates to a cyclic program means which is operable to automatically control the operation of various different mechanisms, including automation machinery, chemical processing machinery, and conventional domestic home appliances such as domestic clothes washing machines. For purposes of convenient explanation the invention will be described with reference to its use on a conventional clothes washing machine.

Conventional cyclic program means sometimes include one or more rotary discs which are driven at slow speed, either continuously or in short repetitive strokes (escapement type). The peripheral edges of these discs are suitably contoured to periodically open and close various electric switches as the discs rotate. The switches in turn control the operation of electric machinery such as the solenoid water valves, detergent dispenser, and tub motor of the conventional washing machine. It will be noted that with such an arrangement there is only one sequence of switch actuator or program, i.e., the program is determined by the manufactured nature of the discs and the speed of the timing motor.

In many instances, as for example in clothes washing machines, it is desired to be able to select from a variety of possible programs. Thus, in the washing of clothes, woolens, wash-wear, whites, and non-fast colors each should preferably have a different program. It is an object of the present invention to provide a device which can selectively deliver a multiplicity of such programs.

One device of the present invention differs from the conventional program timer in that, instead of utilizing a continuously rotating program disc there is utilized a stop-and-go disc. During the stop periods the disc operates certain switches in accordance with its position, and the time length of each stop period determines how long these particular switches are actuated. The length of travel of the disc during its go movement determines the next position of the disc and consequently the switches which will be energized during the next stop period.

It will be seen that the nature of the program can be varied merely by changing the time length of each stop period and the distance traveled during each go period. The present invention utilizes a series of control devices, each including a manual selector for selecting the stop-and-go characteristics or program.

The invention has for its primary object the provision of a simplified cyclic program means which may be manually controlled or directed to put out a large variety of programs.

A further object of the invention is to provide a program means having a progressively indexable program member movable to different operating locations, together with a plurality of control devices individually operable to control the program member index stroke and time of dwell between strokes, and a series of manual pushbuttons for selecting the control device which is operative on the program member, the arrangement being such that a number of different programs may be put out by the program member, one for each selector button, or in some cases one program using combinations of buttons.

A further object of the invention is to provide a cyclic program means wherein a relatively small number of electrical switches are operable to provide a relatively large number of separate programs.

A further object of the invention is to provide program means wherein printed circuit discs are employed so as to simplify the electrical installation and hook-up at the factory.

A still further object of the invention is to provide a printed circuit type program means wherein much of the conventional electric harness components are eliminated.

An additional object of the invention is to provide a cyclic program means having a special mechanism for ensuring that the parts will not get out of adjustment relative to one another.

Other objects of the invention will be apparent from the following description.

Figure 1:
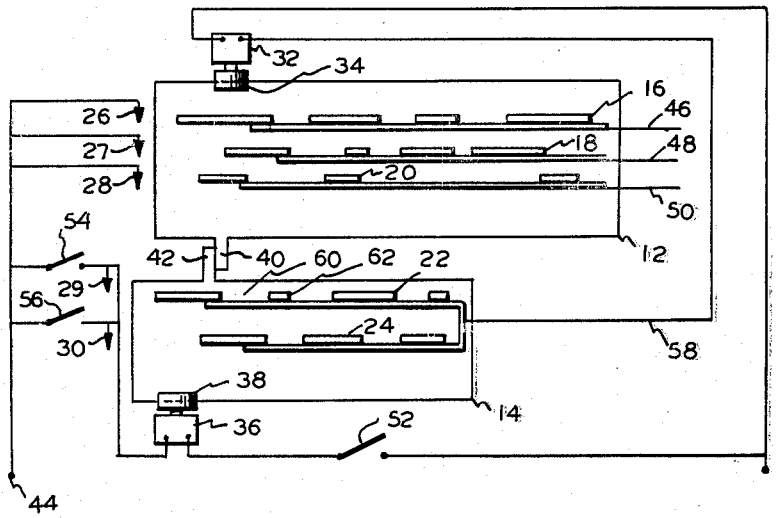
FIGURE 1 is a schematic view illustrating the general mode of operation of the deviec shown in FIG. 2.

Referring in greater detail to the drawings, and in particular FIG. 1, there is schematically shown a program means 10 comprising a first disc or board 12 and a second disc or board 14. Disc 12 corresponds to the aforementioned stop-and-go program disc, and disc 14 functions as a control means to determine the nature of the stop-and-go characteristics. Disc 12 is provided wth three printed electric circuit tracks 16, 18 and 20, while disc 14 is provided with two printed circuit tracks numbered 22 and 24. Each of these tracks is formed of electrically conductive material so that when the respective disc is advanced to the left into registry with the fixed electrical contacts 26 through 30, electrical circuits are completed through the tracks.

Disc 12 is adapted to be moved to the left by a friction roller 34 which is driven by a high speed electric motor 32. Disc 14 is normally driven to the left by a friction roller 38 which is powered by a low speed motor 36. The two discs are provided with a lost motion connection comprising projections 40 and 42 arranged so that during certain operational periods the high speed leftward motion of disc 12 may be utilized to drive the disc 14 to the left at a faster rate than would otherwise be attained by motor 36.

As shown in FIG. 1, each of the contacts 26, 27 and 28 is connected to a source of current 44, and each of the printed tracks 16, 18 and 20 is connected to a line 46, 48 or 50, said lines leading to different electrical devices which it is desired to operate at selected times and for selected intervals. It will be seen that when disc 12 has moved a predetermined distance to the left, a circuit will be completed from switch contact 26, through the printed tracks 16 and thence to the machine line 46 so as to energize said machine. A further slight leftward movement of the disc 12 is effective to cause engagement between contact 28 and the printed track 20, so that both of the machine lines 46 and 50 are then energized. A still further left-ward movement of the disc 12 is effective to energize the track 18 and its machine line 48. It will be noted that each of the tracks 16, 18 and 20 is provided with non-printed portions so that when the disc is in a location with the non-printed portions registering with the contacts 26, 27 or 28 no current will flow through the respective track. By halting disc 12 at different positions of leftward adjustment it is possible to energize any combination of the machine lines 46, 48 or 50.

Under this invention the length of time during which a particular machine is energized is controlled by disc 14. Normally the disc 14 is propelled to the left by the slow speed motor 36, said motor being put into operation when the manual starter switch 52 is energized. FIG. 1 shows two fixed contacts at 29 and 30, each being provided with a manual selector switch 54 or 56. One or the other of these selector switches would be manually actuated at the start of the cycle, depending on the nature of the program desired. Assuming for purposes of illustration that in a given cycle selector switch 54 is energized, when motor 36 advances disc 14 to the left contact 29 is engaged by printed track 22, whereupon a circuit will be completed through line 58 to motor 32. Motor 32 is arranged to drive disc 12 at a relatively fast rate (much faster than motor 36) so that when motor 32 is energized it rapidly indexes disc 12 to the left. As disc 12 undergoes the leftward indexing movement its projection 40 strikes the projection 42 to thus carry the disc 14 along with disc 12 at a relatively rapid rate. The indexing movement is completed when the first void space 60 in track 22 registers with contact 29, since such registration de-energizes motor 32.

As previously indicated, motor 36 continuously operates at a slow rate so that when the index stroke is completed, motor 36 will continue to advance disc 14 to the left at a slow speed. This slow movement of disc 14 will continue without any motion of disc 12. As soon as the disc 14 has advanced a sufficient distance to place the second conductive portion 62 of track 22 in engagement with contact 29, motor 32 will again be energized to rapidly index the disc 12 and disc 14 to the left. The intermittent indexing movements will be repeated until the cycle is completed, i.e., until the last printed portion on track 22 leaves contact 29.

From the above brief discussion it will be seen that disc 12 functions as a mechanism for positioning its conductive tracks 16, 18 and 20 in various fixed positions relative to the contacts 26, 27 and 28 to thereby determine which of the machine lines 46, 48 and 50 are at any one time energized. Disc 14 functions as a control means for controlling the length of each index stroke of disc 12 and for controlling the time of dwell between successive indexing strokes. By manufacturing board 14 with various differently configured tracks it is possible to provide disc 12 with any desired combination of index strokes and dwell times (i.e., programs). FIG. 1 shows disc 14 as provided with two differently configured tracks 22 and 24, but it is possible to add any number of tracks. The device shown in FIGS. 2 through 6 is provided with eight control tracks corresponding to the FIG. 1 tracks.

Figure 3:
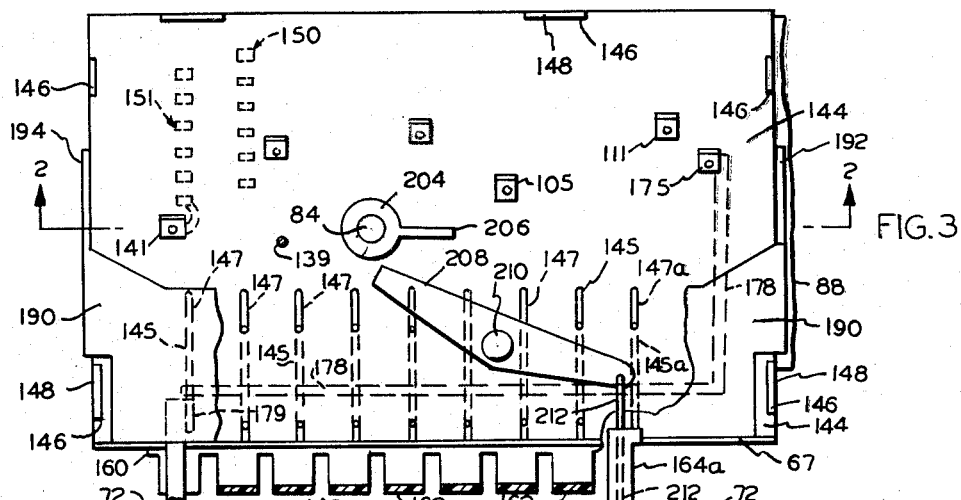
FIG. 3 is a top plan view of the FIG. 2 embodiment with certain parts broken away on line 3—3 for illustrational purposes.
Figure 4:
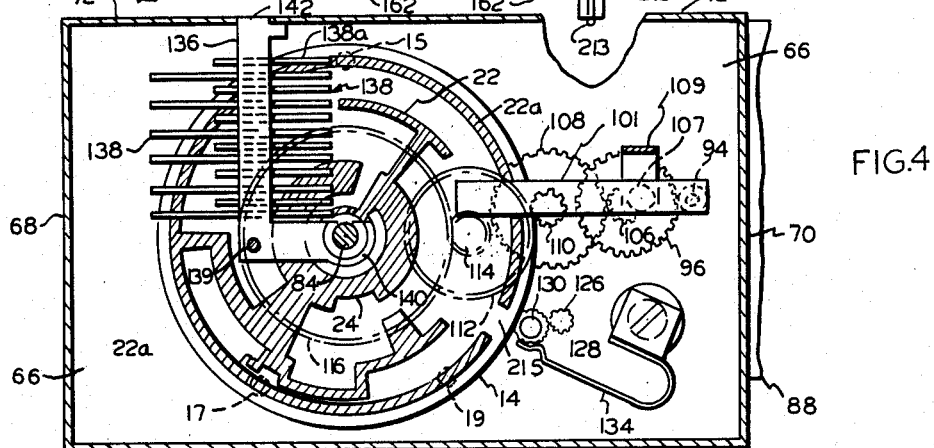
FIG. 4 is a sectional view taken on line 4—4 in FIGS. 2 and 6.
Figure 5:
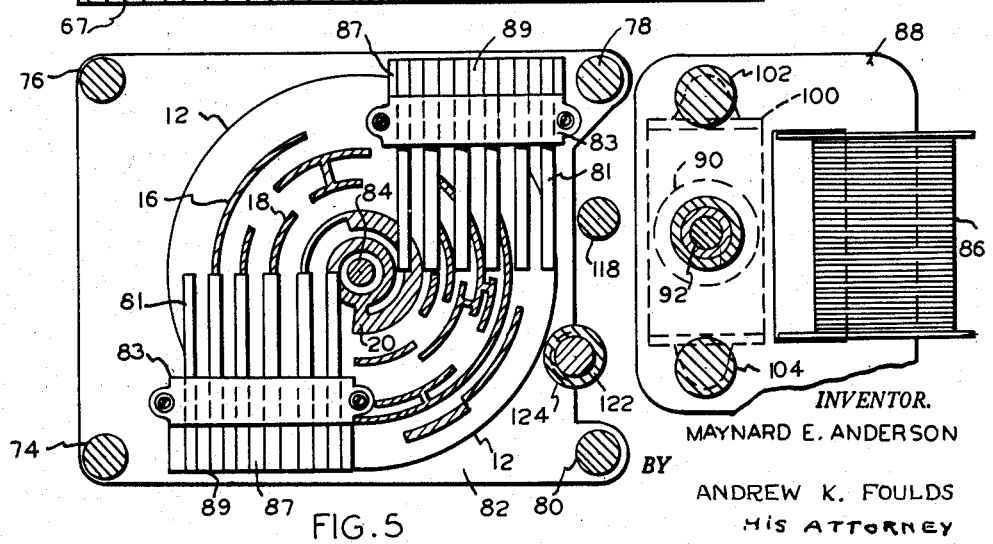
FIG. 5 is a sectional view taken on line 5—5 in FIGS. 2 and 6.

Referring now to FIGS. 2 through 6, there is shown a timer mechanism of the invention comprising a housing 64 having a bottom wall 66, an upstanding front wall 67, a left upstanding end wall 68, a right end wall 70, and a rear wall 72. As shown in FIG. 5, housing 64 is provided with four integrally formed posts 74, 76, 78 and 80, located generally adjacent the corners of the housing. The lower ends of these four posts abut against a plate or base 82, and suitable screws (not shown) are extended through the plate and into respective ones of the posts to secure the plate in fixed position relative to housing 64.

Extending through housing 64 and plate 82 is a rotary shaft 84, and affixed thereto is a disc 12 having a series of printed generally circular tracks, including three tracks numbered 16, 18 and 20. These tracks correspond in function with the tracks shown in FIG. 1.

Current is delivered to and from the various disc 12 tracks via flexible spring-like brushes 81 preferably constructed as shown in copending application, Serial No. 109,174, filed May 10, 1961. Each of the brushes is mounted in one of two dielectric blocks 83 mounted on the underside of housing bottom wall 66, as by screws 85. The outer portion 87 of each block 83 is provided with a flat upper face 89, and the upper faces of the brush end portions are flush with face 89 so that a female connector member (not shown) may be plugged onto each block portion 87 to supply the various brushes with power and to deliver power therefrom to the electrical devices serviced by the program means.

Figure 2:
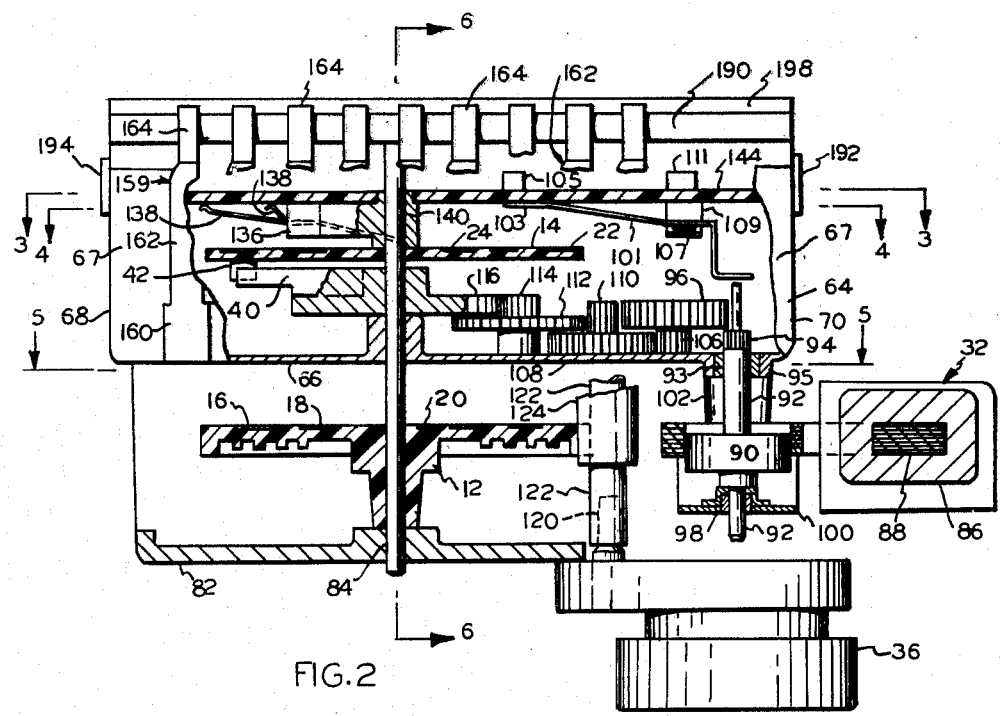
FIG. 2 is an elevational view of one embodiment of the invention, with parts thereof broken away substantially on line 2—2 in FIG. 3.

Program disc 12 is adapted to be rapidly indexed in a clockwise direction by means of a conventional electric motor 32, said motor being provided with a coil portion 86, a laminated magnetic frame 88 and a rotor 90, which is affixed to a slidable shaft 92. As best seen in FIG. 2, shaft 92 extends upwardly through a fixed bearing 93 carried in a boss 95 of wall 66. The upper end of shaft 92 carries a small gear 94 which, when the motor is de-energized (as illustrated) is located below the level of the larger gear 96. The lower end portion of shaft 92 is journaled in a bearing structure 98 suitably carried in a generally U-shaped bracket 100. The bracket and laminated frame of the motor are together mounted in fixed position on two posts 102 and 104 which project downwardly integrally from housing bottom wall 66. In the de-energized condition of the motor the rotor 90 is gravitationally urged downwardly to its illustrated position. If motor 32 were placed above gear 96 then a spring (not shown) could be utilized to maintain gear 94 out of mesh with gear 96 in the de-energized condition of the motor.

In the illustrated embodiment, upon energization of the coil of the motor the magnetic flux draws the rotor upwardly into a radially aligned condition level with the frame 88 such that the teeth of gear 94 mesh with the teeth of gear 96. A suitable gear train including gears 106, 108, 110, 112, 114 and 116 is provided between gear 96 and the shaft 84 to translate motor energization into relatively fast indexing movement of the disc 12, it being noted that both the gear 116 and disc 12 are affixed to the shaft 84 for conjoint movement therewith.

It will be noted from FIGS. 2 and 4 that shaft 92 is located directly below the end portion of a flexible spring arm 101. The other end portion 103 of arm 101 is mounted on the underside of a terminal board 144, a suitable rivet being provided to connect the portion 103 with terminal 105. The intermediate portion of arm 101 carries a contact 107 which registers with a contact carried on bracket 109 depending from terminal 111. The two terminals are suitably connected into the electrical circuit so as to control the flow of current through the various tracks on disc 12. Thus, when arm 101 is depressed (as shown) the various tracks on disc 12 are potentially capable of transmitting current; when arm 101 is raised the circuit across terminals 105 and 111 is cut, and all of the tracks on disc 12 are dead. Raising of arm 101 is accomplished by upward motion of shaft 92. Arm 101 and the associated electrical contacts may be considered to constitute a master switch.

The sequence of motions includes energization of motor 32, raising of shaft 92, deadening of the tracks on disc 12 by arm 101, and indexing movement of disc 12. The indexing movement continues for a space of time (as for example two-thirds of a second), after which the motor 32 is de-energized, disc 12 stops, and the tracks on disc 12 are made potentially live (by arm 101). It will be noted that when disc 12 is moving the tracks are dead so that arcing across the brushes and tracks is prevented. This track-deadening is the purpose of and reason for switch arm 101.

As shown in FIG. 2, gear 116 is provided with an integrally formed sweep arm 40 which is in alignment with a pin-like projection 42 depending from circular disc 14. Disc 14 corresponds with the same numbered disc of FIG. 1, and is freely journaled on shaft 84 so that disc 14 may be driven without imparting any motion to shaft 84 or disc 12. Three upstanding bosses 15, 17 and 19 (FIGS. 4 and 6) may be provided on housing bottom wall 66 to support disc 14 against wobbling.

In order to drive disc 14 independently of disc 12 there is provided a timing motor 36 having its output shaft 120 connected with a rotary shaft 122 which is suitably journaled in a hollow post 124 formed integrally with the housing bottom wall 66. Motor 36 may be suitably fixedly mounted, as by attaching same to two fixed posts, one of which is shown at 118 in FIG. 5. Various means could of course be utilized to secure the motor in place.

Figure 6:
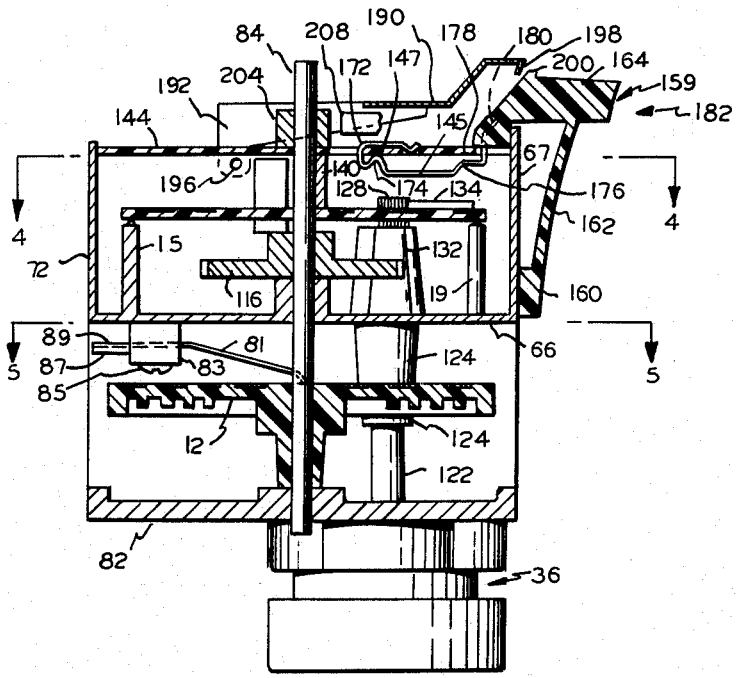
FIG. 6 is a sectional view taken on line 6—6 in FIG. 2.

Refering to FIG. 4, the upper end portion of rotary shaft 122 is toothed to provide a shallow gear portion 126, the arrangement being such that when motor 36 is energized the resulting rotary motion of shaft 122 causes the gear 126 to rotate the externally toothed cylindrical member 128 (FIG. 4). Member 128 is floatably positioned on a small upstanding pin 130 suitably mounted in a boss or post 132 (FIG. 6). As will be seen from FIG. 4 of the drawings, toothed cylinder 128 is arranged to contact the periphery of disc 14 as well as the surface of gear 126. There is thus provided a driving connection from the motor 36 to the disc 14. This driving connection must not interfere with the movement of disc 14 during the rapid index periods. For this reason the pin 130 is smaller than the internal diameter of cylinder 128 so that when the disc 14 is driven by the sweep arm 40 (FIG. 2) the cylinder 128 will be forced out of force-transmitting engagement with the gear 126 and/or disc 14. A leaf spring arm 134 is preferably provided to maintain the cylinder 128 in meshing engagement with gear 126 when the motor 36 is being utilized as a driver means for disc 14. The motors and gear trains therefor are so chosen that the index speed will be many times the slower speed, as for example six r.p.m., as opposed to one seventy-second r.p.m.

Referring generally to the placement of disc 14 in the system, there is shown in FIG. 3 a terminal board 144 having a power input terminal 141 which connects with one of a number of contact areas 151. The connection further includes a brush 138 extending from the input contact area to one of the tracks on disc 14 (FIG. 4). Current is taken from the tracks through other ones of the brushes 138 and delivered to certain of the contact areas 150 and 151, thence over to a selected one of the selector switch elements 145, and ultimately to a terminal 175 which connects with motor 32 to energize same. The general arrangement is such that index motor 32 is energized for periods determined by the nature of the disc 14 track corresponding to a selected switch 145.

Referring in greater detail to the above described arrangement, as best shown in FIG. 4, the upper face of disc 14 is provided with a series of connected circular printed circuit tracks, including two tracks numbered 22 and 24. These tracks correspond in function with the tracks numbered 22 and 24 in FIG. 1. To conduct current to and from the tracks there is provided a brush mechanism comprising a block-arm 136 and a series of flexible spring-like brushes 138. The preferred construction of these brushes is shown in copending application, Serial No. 109,174, filed May 10, 1961.

Block-like arm 136 is of generally right angular configuration as shown in FIG. 4, with a hub portion 140 thereof mounted freely on shaft 84, and with an end portion 142 fitting within a notch in the housing rear wall 72. Block 136 may be provided with a pin-like projection 139 fitting within an opening in rectangular terminal board or disc 144, said disc being provided with six peripheral notches 146 which fit around tab-like extensions 148 of the various housing upstanding walls. Suitable U-shaped clip means (not shown) may be provided to retain the terminal board against upward displacement off of the housing. As seen in FIG. 3, the underside of board 144 is provided with a series of printed circuits including the printed contact areas designated collectively by numerals 150 and 151. These contact areas are continually engaged by respective ones of the twelve brushes 138 (FIG. 2). It will be seen that certain of the brushes 138 are elongated so as to engage the board 144 contact areas 151, while the other six brushes are shorter and extend in a more nearly vertical direction so as to engage the printed board 144 in the contact areas generally designated by numeral 150. This is done so that the brushes can have a relatively extensive contact area and lateral thickness without crowding the brushes or printed circuits too closely together.

From the above description it will be seen that brushes 138 serve merely to conduct current from the tracks on disc 14 to the contact areas 150 and 151. Certain of these contact areas are connected to respective ones of the wire-form switch elements 145 shown in FIGS. 3 and 6, the switch element-engaging contact areas being designated in FIG. 6 by numeral 147. The various contact areas 147 are preferably connected to respective ones of the twelve contact areas 150, 151 by circuit printing on the underside of board 144. In the interest of clarity this printing is omitted from the drawing. The track-engaging portions of brushes 138 correspond in function with contacts 29 and 30 in FIG. 1, and switch elements 145 correspond with switches 54 and 56 in FIG. 1.

Each of the various switch elements 145 is adapted to be manually operated by one of the pushbutton selectors 159 shown best in FIG. 6. Each selector comprises a mounting portion 160 secured to the housing front wall 67, a reed-like arm portion 162, and a manually actuable button portion 164. Each selector 159 is originally molded with mounting portion 160 out of alignment with the arm portion 162 so that when the selector is later connected to wall 67 portions 162 and 164 are automatically biased to the right (FIG. 6). The features of such automatic biasing are shown in copending application Serial No. 110,583, filed May 16, 1961. As shown in FIG. 6, each selector button 164 overlies a portion of one of the wire form switch elements 145, each switch element including a U-shaped rear portion 172 for clamping itself onto the terminal board 144, and an upwardly projecting portion 174 firmly and continuously in engagement with printed circuit area 147 on the board undersurface. Another portion 176 of each wire form switch element registers with a printed strip portion 178 of the printed circuit, while still another portion 180 of each switch element extends upwardly into cam engagement with a laterally extending portion 179 (FIG. 3) of selector button 164. The arrangement is such that when manual force is applied to the selector button 164 in the arrow 182 direction the button slides along the upper surface of board 144 to thus permit the spring arm switch element to snap upwardly to engage contact area 178 and thus complete a circuit to the terminal 175 which is connected therewith (FIG. 3). This terminal connects with the indexing motor 32 through suitable wiring (not shown). The power input for the circuitry serviced by disc 14 is provided by terminal 141, although the connections could be reversed if desired, i.e., terminal 141 could connect to the motor and terminal 175 to the power supply.

As previously noted, during any one program only one of the selector switches 145 is energized. In the FIG. 2 embodiment mechanism is provided to hold the actuated selector button down and to preclude the inadvertent leaving of more than one selector switch in an actuated condition. This mechanism comprises a latch plate or bar 190 which overlies the entire front area of the terminal board 144. The bar is provided with two downwardly extending wings or ears 192 and 194, suitable pivots 196 (FIG. 6) being provided to mount the bar for pivotal movement relative to housing 64. As shown best in FIG. 6, the bar is provided at its forward edge with a downwardly directed flange or lip 198. This flange or lip overlies all of the selector elements 159 so that when a selected one of the buttons 164 is manually moved in the arrow 182 direction the upstanding portion 200 thereof initially engages lip 198 to lift the latch bar upwardly about its pivots 196, thereby releasing any of the other buttons 164 which may have been in depressed conditions. Further movement of button 164 in the arrow 182 direction allows the latch bar to drop downwardly so that its lip 198 is located at the rear of projecting portion 200, thereby retaining the selected switch in an actuated condition. The latch bar may be normally biased in a downward direction, either by its own weight or by a spring (not shown).

It will be understood that with the illustrated arrangement only one of the selector switches can be retained in the depressed position at any one time, since the act of depressing one of the switches automatically releases any of the other switches which may have been depressed previously. For further particulars in regard to the switch-latch bar relationship reference is made to the above-mentioned copending application, Serial No. 110,583, filed May 16, 1961.

With the FIG. 2 embodiment shaft 84 undergoes one complete revolution per program. It is desirable that at the conclusion of each program all of the selector switches 145 shall be de-energized so that the succeeding program will be according to the housewife's wishes; i.e., that she will be required to push one of the pushbuttons 164 at the next program cycle. In order to ensure such an action shaft 84 is provided on its upper end with a collar 204 having an arm 206 formed integrally therewith. Cooperating with arm 206 is a crank 208 having a pivotal mounting on the board 144, as by means of the pivot pin 210. The right end of crank 208 connects with a wire form arm 212 which freely extends through a button 164a similar in shape to the aforementioned button 164 except that it is shortened (because it is not arranged to be manually actuated). A turned end portion 213 on arm 212 causes button 164a to be drawn toward the timer housing when a counterclockwise motion is given to crank 208 by arm 206.

Button 164a rests and slides on the upper surface of board 144, with a portion thereof overlying a wire form control switch element 145a which is constructed similarly to each of the switch elements 145. The relation of switch 145a to operator 164a is preferably the reverse of the relation between each element 145 and operator 164; i.e., drawing in of operator 164a serves to open switch 145a instead of opening it. The arrangement of parts is such that as the program nears completion arm 206 strikes crank 208, which action causes button 164a to be drawn toward the lip 198 of latch bar 190, thereby raising the latch bar and permitting the built-in bias force of the previously depressed button 164 to snap it back to a de-energized condition. In this manner the button which is actuated at the beginning of each program is automatically released as that program is completed; this action ensures that the housewife will make a mental and physical selection of a desired button at the start of each cycle, since the cycle cannot begin until one of the buttons 164 is depressed.

Switch element 145a controls a circuit from printed portion 178 (FIG. 3) to another printed portion which connects with a brush 138a (FIG. 4). As shown in FIG. 4, the rapid advance control disc 14 is provided with a substantially continuous track 22a so that when switch element 145a is closed the rapid advance motor 32 rapidly indexes or resets the discs forward to the zero position. This reset action ensures that when the housewife makes a new selection she will not be breaking in on a partially completed program.

The timer is in the zero or starting position when break 215 in track 22a contacts the brush 138a. Collar 204 is preset on shaft 84 so that in the zero position arm 206 is holding crank 208 in a counterclockwise position of adjustment such that button 164a is in the drawn-in position. Thus, when the housewife depresses a selected one of the buttons 164 at start of a cycle the button 164a will not pop out as the latch bar 190 is raised; instead button 164a will remain in the drawn-in position during the cycle (initially by crank 208 and later by bar 190). If the housewife should decide to change a cycle partway through a program, her act of pushing a new button 164 releases the previously selected button 164, and the cocked in button 164a snaps out to feed current to the rapid advance motor 32 via the track 22a. In this manner the timer automatically resets itself to the zero position in the event that the housewife should push any of the buttons 164 partway through a cycle.

From the above it will be seen that in operation of the FIG. 2 embodiment, before start of the washing machine cycle a desired one of the selector buttons 164 is manually depressed. At start-up the motor 36 begins to turn disc 14 at a slow constant speed as for example ½ r.p.m. The depression of the selected button 164 permits current to flow from the input terminal 141 through the innermost one of the brushes 138, the selected control track on board 14, the selected brush 138, the selected switch 145, terminal 175, and the index motor 32.

The index movement of disc 12 is relatively rapid as compared with the normal speed of movement of the disc 14. Thus, the slow speed of discs 14 may be ½ r.p.m., while the rapid indexing speed of disc 12 may be in the neighborhood of 6 r.p.m., roughly four hundred times the slow speed. During the indexing stroke of disc 14 the arm 40 strikes pin 42 on disc 14 so that disc 14 is indexed along with the disc 12. As soon as the selected brush 138 is contacted by a void space in the selected track on disc 14 the indexing motor 32 is deenergized to thus discontinue the index stroke. Thereupon the disc 12 halts, while the disc 14 is continued to be moved at a slow rate by motor 36. The slow rotation of disc 14 continues until the next printed circuit portion on the selected track on board 14 contacts the selected brush 138, whereupon the board 12 is indexed rapidly to a new location in the same manner as previously described.

From the above description it will be seen that the operation is characterized by alternate periods of (1) rapid indexing of program disc 12 and control disc 14 and (2) periods wherein program disc 12 is motionless while disc 14 is moving slowly at a timed rate. During the dwell periods of disc 12 the ones of its tracks which are then engaged with the brushes 81 carry the current to the washing machine components to which they are connected (via the plug-on connections at 89). The times of the various dwell periods and lengths of the index strokes are determined by the nature of the selected track on disc 14, with the length of each dwell period being determined by the length of the void space in the selected disc 14 track, and the length of index stroke being determined by the length of conductive space in the selected disc 14 track.

With this invention it is possible to provide a relatively large number of separate and distinct automatic programs using a comparatively small number of switches and moving parts. Also, with this invention it is possible to carry out a desired program without any so-called "waiting periods." Thus, in the washing machine illustration, if it is desired in one program to spin directly after agitation, while in another program to interpose a water spray period between the agitating and spinning, the second program could be carried out without a wait between the agitating and spinning steps. To the housewife this means that if a given cycle as, for example, "woolens" has fourteen minutes of operating time, while a second cycle, as for example "white and colorfast" has a twenty-eight minute operating time, the housewife will, when washing woolens, be able to perform the job in fourteen minutes and not go through inoperational periods such as would be the case if the timing motor alone were to control the cycle. The only lost time is the index time, and such time in the usual situation is very small, in most cases less than one percent of the total cycle time.

As previously noted the invention is applicable in many fields, and it is not desired to restrict the invention except as otherwise set forth in the appended claims.

I claim:

1. In combination, a cyclic program means progressively indexable to different operating locations; control means including a number of electrical circuits for individually controlling the program means index stroke and time of dwell between strokes; and means for selecting the electrical circuit which is to be operative for control purposes; said program means comprising a series of electrical contacts, and said control means comprising mechanism operable to automatically unload said contacts just prior to the start of each index stroke.

2. The combination of claim 1 wherein the program means comprises an indexing motor having a rotor and stator arranged during the dwell periods to be axially offset from one another; said contact unloading mechanism comprising a switch located to be operated by relative axial movement of the rotor and stator caused by energization of the motor.

3. The combination of claim 1 wherein the program means includes means for automatically halting itself at the same precise location after each cycle.

4. The combination of claim 1 and further comprising mechanism automatically effective during a cycle to drive the program means to its start position in the event that the user changes the circuit selection part way through a cycle.

5. The combination of claim 1 wherein the control means comprises a continuously operating normally slow moving member normally advancing at a speed substantially less than the speed of the program means during its index stroke; the combination further comprising mechanical drive means arranged to impart drive from the program means to the control member during the index stroke without impeding the control member during its normally slow movement, the relationship being such that the control member and program means have the same precise physical locations relative to one another at the start of each dwell period.

6. The combination comprising a cyclic program means having a rapid advance drive for progressively rapidly indexing itself to different operating locations; control means for the program means including means for directing when the rapid advance drive shall begin and end; a relatively slow advance drive for the directing means; and a mechanical driving connection between the programming means and the directing means whereby during the index stroke both the program means and directing means are moved at a rapid rate, and during the dwell periods between index strokes only the directing means is moving.

7. The combination of claim 6 wherein the program means comprises a first printed circuit disc, and the directing means comprises a second printed multi-circuit disc; said discs being arranged in generally parallel relation on a common shaft, the second disc being free on the shaft so as to be moved about the shaft by its slow advance drive without imparting movement to the shaft, and the first disc being affixed to the shaft with the rapid advance drive going through the shaft and thence to the first disc.

8. A timer comprising a rotary program member; a first electric motor for intermittently driving said program member at high speed; means for controlling energization of the first electric motor comprising a rotary control member; a second electric motor for continuously driving the control member at low speed; and a lost motion mechanical driving connection between the program member and the control member so that (1) when the second motor only is runing the control member is driven slowly without affecting the position of the program member, and (2) when the first electric motor is running a mechanical drive is imparted to the program member and the control member such that both members move together.

9. The combination of claim 8 wherein the program member opens and closes a series of electrical contacts; the aforementioned control means comprising mechanism operable to automatically unload said contacts just prior to the start of each movement of the program member.

10. The combination of claim 8 wherein the first electric motor comprises a rotor and stator arranged when the motor is de-energized to be axially offset from one another; said program means comprising a series of electrical contacts closable by the rotary program member, and said control means comprising a master switch operable to unload said contacts; said master switch being arranged so that when the first motor is energized the rotor and stator thereof undergo relative axial movement, which movement is transmitted to the master switch so that the aforementioned electrical contacts are automatically unloaded just prior to the start of each moevment of the program member.

11. A timer comprising a rotary program disc having a series of printed circuits on one of its faces; a first electric motor having a disengageable driving connection with the program disc for intermittently driving same at high speed; means for controlling energization of the first electric motor including a rotary control disc having a plurality of printed circuits thereon; a second electric motor having a friction driving connection with the control disc for continuously driving same at low speed; and a lost motion mechanical driving connection from the program disc to the control disc so that (1) when the second motor only is running the control disc is driven slowly without affecting the position of the program disc, and (2) when the first electric motor is energized a driving connection is established to the program disc and the control disc.

12. The combination of claim 11 wherein the disengageable driving connection comprises a first gear continuously operatively connected with the rotor of the first motor and a second gear continuously operatively connected with the program disc; the rotor of the first motor being normally axially offset from the stator of said first motor when said motor is de-energized, and energization of said first motor causing the rotor to move axially for meshing the two gears.

13. The combination of claim 11 wherein a series of fixedly mounted reed-like electrically conductive brushes are arranged adjacent the printed circuits on each of the discs so that rotation of each disc causes the printed circuits thereon to periodically engage the reed-like brushes.

References Cited in the file of this patent

UNITED STATES PATENTS

| | | |
|---|---|---|
| 1,605,471 | Schenk | Nov. 2, 1926 |
| 2,905,239 | Dietz | Sept. 22, 1959 |
| 3,003,097 | Jennings | Oct. 3, 1961 |